USO11713710B2

(12) United States Patent
Qu

(10) Patent No.: US 11,713,710 B2
(45) Date of Patent: Aug. 1, 2023

(54) TOPOLOGICAL ROTARY ENGINE

(71) Applicant: HUAZHONG UNIVERSITY OF SCIENCE AND TECHNOLOGY, Hubei (CN)

(72) Inventor: Jinping Qu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/603,588

(22) PCT Filed: Aug. 5, 2020

(86) PCT No.: PCT/CN2020/107022
§ 371 (c)(1),
(2) Date: Oct. 14, 2021

(87) PCT Pub. No.: WO2022/021462
PCT Pub. Date: Feb. 3, 2022

(65) Prior Publication Data
US 2022/0307413 A1    Sep. 29, 2022

(30) Foreign Application Priority Data
Jul. 29, 2020 (CN) .......................... 202010745290.8

(51) Int. Cl.
*F02B 55/02* (2006.01)
*F01C 1/22* (2006.01)
(Continued)

(52) U.S. Cl.
CPC ................ *F02B 55/02* (2013.01); *F01C 1/22* (2013.01); *F01C 21/18* (2013.01); *F02B 53/10* (2013.01);
(Continued)

(58) Field of Classification Search
CPC .......... F02B 53/10; F02B 53/12; F02B 55/02; F02B 55/08; F02B 55/14; F02B 55/16; F01C 1/22; F01C 21/18
See application file for complete search history.

(56) References Cited

U.S. PATENT DOCUMENTS 3,286,698 A * 11/1966 Peras ....................... F02B 55/14
418/101
3,359,950 A * 12/1967 De Coye DeCastelet ...................
F02B 53/10
418/61.3
(Continued)

FOREIGN PATENT DOCUMENTS

CN         204936794       1/2016
CN         105422272       3/2016
(Continued)

OTHER PUBLICATIONS

"International Search Report (Form PCT/ISA/210) of PCT/CN2020/107022," dated Apr. 29, 2021, pp. 1-5.
(Continued)

*Primary Examiner* — Audrey B. Walter
(74) *Attorney, Agent, or Firm* — JCIPRNET

(57) ABSTRACT

A topological rotary engine includes a first transmission mechanism, a second transmission mechanism, a valve mechanism, a rotor, and a cylinder. The rotor is arranged in an inner chamber of the cylinder. A cross section of the rotor is a curved-side topological polygon having n sides. A cross section of the inner chamber of cylinder is a curved-side topological polygon having n+1 sides, and n is an even number greater than or equal to 4. An outer topological curved surface of the rotor is meshed with an inner topological curved surface of the cylinder. The rotor reversely revolves around an axis of the cylinder with an eccentricity as a radius while rotating, and divides the cylinder into n+1
(Continued)

independent chambers. The cylinder is provided with n+1 fuel injection nozzles and n+1 spark plugs, which cooperate with the rotor and the valve mechanism.

8 Claims, 2 Drawing Sheets

(51) Int. Cl.
    *F02B 53/10*     (2006.01)
    *F02B 55/08*     (2006.01)
    *F02B 55/14*     (2006.01)
    *F01C 21/18*     (2006.01)
    *F02B 53/12*     (2006.01)
    *F02B 55/16*     (2006.01)

(52) U.S. Cl.
    CPC .............. *F02B 53/12* (2013.01); *F02B 55/08* (2013.01); *F02B 55/14* (2013.01); *F02B 55/16* (2013.01)

(56) References Cited

U.S. PATENT DOCUMENTS 4,316,439 A * 2/1982 Tyree ..................... F01C 1/103
                                                                                                                    418/187
2010/0132658 A1   6/2010 Ngo

FOREIGN PATENT DOCUMENTS

| | | | |
|---|---|---|---|
| CN | 110242407 | 9/2019 | |
| CN | 110242407 A * | 9/2019 | .............. F02B 53/00 |
| DE | 202009017893 | 7/2010 | |
| RU | 2411375 | 2/2011 | |

OTHER PUBLICATIONS

"Written Opinion of the International Searching Authority (Form PCT/ISA/237) of PCT/CN2020/107022", dated Apr. 29, 2021, pp. 1-4.

* cited by examiner

TOPOLOGICAL ROTARY ENGINE

CROSS-REFERENCE TO RELATED APPLICATION

This application is a 371 of international application of PCT application serial no. PCT/CN2020/107022, filed on Aug. 5, 2020 which claims the priority benefit of China application no. 202010745290.8, filed on Jul. 29, 2020. The entirety of each of the above mentioned patent applications is hereby incorporated by reference herein and made a part of this specification.

FIELD OF THE DISCLOSURE

The disclosure relates to the technical field of engines, and more specifically, relates to a topological rotary engine.

DESCRIPTION OF RELATED ART

Engine involves all aspects of life and economic society, and plays a very important role in domestic economy. Since 1860s, piston engine has undergone continuous improvement and development, and has become the most commonly used engine in people's life. However, since piston engine adopts crank connection rod mechanism for power transmission, there are some inherent shortcomings. (1) Every time when spindle rotates for two cycles, a single working chamber completes a four-stroke working cycle and performs work once. (2) The movement of the piston causes the reciprocating inertia force, which increases by squares with the increase in speed. (3) The energy conversion efficiency is low. In the first quarter of the work stroke, although the piston is under the high pressure of gas, the rotation angle is small and the external work is small. (4) There is alternating side pressure between the piston and the cylinder wall, which causes serious wear on the piston cylinder in an ununiformed manner. (5) There are top and bottom dead center positions in the transmission process, which often causes shock and vibration.

Currently, there are two major methods for improving the fuel economy of piston engines, increasing thermal efficiency, and reducing emissions. One method is to increase the energy utilization efficiency of the engine and improve the emission characteristics of the engine. The other method is to develop a new type of engine without reciprocating pistons. The first method utilizes various technical indicators that can be achieved by various auxiliary machines after more than a hundred years of improvement, and it is less likely for the first type of method to achieve further improvement on performance. Therefore, domestic and foreign researchers have devoted a lot of energy and funds to the second method. However, in this method, only the Wankel engine has been applied to a small scope in Mazda RX series sports cars and drones. The triangular rotor of the Wankel engine rotates for one cycle, the spindle rotates for three cycles, and the engine does work three times. The Wankel engine has a higher horsepower-to-volume ratio. Implementation in practice has proved that the horsepower volume of the Wankel engine is significantly improved compared to a reciprocating piston engine. However, due to the structure and transmission characteristics of the triangular rotor of the Wankel engine, such engine has obvious defects, such as insufficient combustion, high fuel consumption, heavy pollution, and short service life. Although Wankel engine has undergone improvement for half a century, there are still a series of problems such as high manufacturing cost, poor air tightness, poor lubricity, cylinder vibration, low durability, etc., so such engine cannot be popularized in practical applications.

SUMMARY OF THE DISCLOSURE

In view of the above defects or requirement of improvement of the conventional technology, the disclosure provides a topological rotary engine, thereby solving the technical problems, such as low combustion efficiency and a large number of movable parts, encountered by conventional piston engine which uses crank connection rods and reciprocating pistons as the main power output mode.

To achieve the above purpose, according to one aspect of the disclosure, a topological rotary engine is provided, which includes a first transmission mechanism, a second transmission mechanism, a valve mechanism, a rotor, and a cylinder arranged in the topological rotary engine. The rotor is arranged in the inner chamber of the cylinder. The cross section of the rotor is a curved-side topological polygon having n sides. The cross section of the inner chamber of cylinder is a curved-side topological polygon having n+1 sides, and n is an even number greater than or equal to 4. The outer topological curved surface of the rotor is meshed with the inner topological curved surface of the cylinder. The rotor reversely revolves around an axis of the cylinder with the eccentricity $\Delta e$ as the radius while rotating, and divides the cylinder into n+1 independent chambers. When the rotor rotates for one cycle, each of the n+1 chambers successively completes n/2 times of air intake, compression, work and air exhaust. The revolution speed of the rotor is n times a rotation speed of the rotor, and the revolution speed of the rotor is the same as the engine output speed. The cylinder has n+1 fuel injection nozzles and n+1 spark plugs. The fuel injection nozzles and the spark plugs cooperate with the rotor and the valve mechanism to keep the fuel to combust and work in the chamber, and output power externally through the first transmission mechanism and the second transmission mechanism.

Preferably, the radius of the round chamfer of the cross section of the rotor is equal to the radius of the round chamfer of the cross section of the inner chamber of the cylinder.

Preferably, the radius of the circumscribed circle of the inner chamber of the cylinder is the difference between the radius of the circumscribed circle of the rotor and the eccentricity $\Delta e$.

Preferably, the rotor is provided with n/2 pairs of intake and exhaust channels, and the number of pairs of the intake and exhaust channels is ½ of the number of topological sides of the cross section of the rotor.

Preferably, the rotor includes a first intake and exhaust channel, a second intake and exhaust channel, a third intake and exhaust channel, and a fourth intake and exhaust channel. Each of the first intake and exhaust channel, the second intake and exhaust channel, the third intake and exhaust channel, and the fourth intake and exhaust channel is L-shaped structures, and has two ends respectively arranged on an end surface of the rotor and a top surface of the round chamfer of the rotor.

Preferably, the first intake and exhaust channel and the second intake and exhaust channel are symmetrically arranged along the axis of rotor. The third intake and exhaust channel and the fourth intake and exhaust channel are symmetrically arranged along the axis of rotor. The first intake and exhaust channel and the fourth intake and exhaust channel are symmetrically arranged at both ends of the rotor, and the second intake and exhaust channel and the third intake and exhaust channel are symmetrically arranged at both ends of the rotor.

Preferably, the first transmission mechanism includes a rotor transmission shaft, a first bearing, a second bearing, a third bearing, a fourth bearing, a first output shaft, a second output shaft, a first counterweight plate, a second counterweight plate, a first output shaft support base, and a second output shaft support base. Both ends of the rotor transmission shaft are respectively connected to the first bearing and the third bearing, the first bearing is arranged in the first counterweight plate, and the third bearing is provided in the second counterweight plate. One end of the first counterweight plate is provided with the first output shaft, and the first output shaft sequentially passes through the second bearing and the first bearing positioning cover arranged in the first output shaft support base. One end of the second counterweight plate is provided with the second output shaft, and the second output shaft sequentially passes through the fourth bearing and the second bearing positioning cover arranged in the second output shaft support base.

The second transmission mechanism includes a first internal gear, a first external gear, a first internal gear support base, a second internal gear, a second external gear, and a second internal gear support base. The first external gear and the second external gear are respectively fastened and assembled on both ends of the rotor transmission shaft. The first external gear is meshed with the first internal gear, and the first internal gear is disposed on the first internal gear support base. The second external gear is meshed with the second internal gear, and the second internal gear is disposed on the second internal gear support base.

The valve mechanism includes a first valve plate, a second valve plate, and a valve chamber. The first valve plate and the second valve plate are symmetrically arranged on both sides of the cylinder, and respectively slidably cooperate with both end surfaces of the rotor.

Preferably, the first valve plate and the second valve plate have the same structure, and both the first valve plate and the second valve plate are provided with valve chambers therein. The second valve plate is provided with a plurality of valve grooves in an elongated-hole shape along the circumferential direction. The number of valve grooves corresponds to the number of inner chambers of the cylinder. The valve chamber communicates with the chamber in the cylinder through the valve groove and the intake and exhaust channel.

Preferably, the first valve plate is provided with a first vent hole, and the first vent hole is used to make the valve chamber in the first valve plate communicate with the external environment. The second valve plate is provided with a second vent hole, and the second vent hole is used to make the valve chamber in the second valve plate communicate with the external environment.

Preferably, the gear ratio of the first internal gear to the first external gear is (n+1):n. The gear ratio of the second internal gear to the second external gear is (n+1):n.

Generally speaking, compared with the conventional technology, the above technical solutions conceived by the disclosure can achieve the following advantageous effects.

1. In the disclosure, the rotor and the inner wall of the cylinder are engaged with each other in a curved manner, which allows the combustion chamber to have good sealing performance, thereby ensuring the adequacy and uniformity of fuel combustion, improving combustion efficiency, saving energy and reducing emissions, and reducing environmental pollution.

2. In the disclosure, by opening intake and exhaust channels on the rotor, during the rotation of the rotor, the cooperation between the intake and exhaust channels and the valve plate and the cooperation between the spark plug and fuel injection nozzle make it possible to complete four strokes of each combustion chamber, namely air intake, compression, work, and air exhaust. Moreover, when the rotor rotates for one cycle, the output shaft rotates for n (n≥4) cycles, the engine does work for n (n+1)/2 times. In this manner, a high horsepower-to-volume ratio and output speed can be achieved.

3. The rotary engine of the disclosure omits the use of crank connection rod and the air valve mechanism, so that the number of movable parts of the engine can be reduced significantly. Accordingly, the number of parts is small, the structure is simple and compact, the volume is small, the output power is high, and the malfunction rate is significantly reduced.

4. The work process of the rotary engine of the disclosure is different from the power transmission and conversion parts of the reciprocating piston engine. All of the work performed by the rotary engine can be directly applied to the rotor and output. In this manner, there is no inertial kinetic energy loss, and the curve of work power is smooth, so the vibration is small, noise is low, and fuel efficiency is high.

5. By changing the structure of specific combustion chamber of the inner chamber of the cylinder of the rotary engine, the present disclosure can adjust the relatively fixed compression ratio according to the demand, improve combustion efficiency, and make the combustion chamber to adapt to gasoline, kerosene, diesel, natural gas, hydrogen and other new energy sources and fuel, etc., thereby increasing the scope of application of the engine to fuel.

6. Each chamber of the topological rotary engine of the disclosure is equipped with independent injectors and spark plugs, which can perform independent combustion work, thereby effectively preventing the cylinder wall of the engine from being impacted by the alternating side pressure as well as the problem of uneven cooling and heating of the cylinder body. In this manner, the service life of the engine can be prolonged.

DESCRIPTION OF EMBODIMENTS

In order to make the purposes, technical solutions, and advantages of the disclosure clearer, the following further describes the disclosure in detail with reference to the accompanying drawings and embodiments. It should be understood that the specific embodiments described here are only used to explain the disclosure, but not to limit the disclosure. In addition, the technical features involved in the various embodiments of the disclosure described below can be combined with each other as long as they do not conflict with each other.

Figure 1:
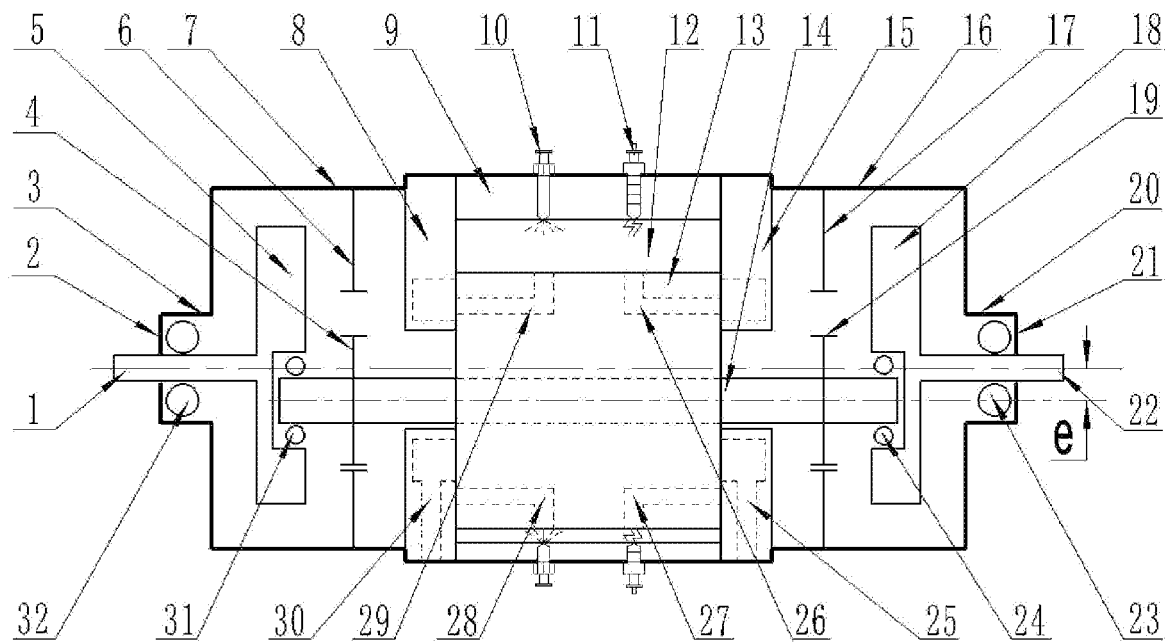
FIG. 1 is a schematic front view of the structure of a topological rotary engine in an embodiment of the disclosure.

As shown in FIG. 1, the disclosure provides a topological rotary engine, which includes a first transmission mechanism, a second transmission mechanism, a valve mechanism, a rotor 13, a cylinder 9, a fuel injection nozzle 10 and a spark plug 11 arranged in the topological rotary engine. The rotor 13 is arranged in the inner chamber of the cylinder 9, the cross section of the rotor 13 is a curved-side topological polygon having n sides, and n is an even number greater than or equal to 4. The cross section of the inner chamber of the cylinder 9 is a curved-side topological polygon having n+1 sides. The outer topological curved surface of the rotor 13 is meshed with the inner topological curved surface of the cylinder 9.

To further illustrate, during operation, the rotor 13 reversely revolves around the axis of the cylinder 9 with the eccentricity $\Delta e$ as the radius while rotating. When the rotor 13 rotates for one cycle, each of the n+1 chambers 12 successively completes n/2 times of air intake, compression, work and air exhaust. The revolution speed of the rotor 13 is n times its rotation speed, and the revolution speed of the rotor 13 is the same as the engine output speed. It should be noted that the eccentricity $\Delta e$ is the eccentricity based on which the axis of the rotor 13 and the axis of the cylinder 9 deviate in parallel. The rotor 13 divides the cylinder 9 into n+1 independent chambers 12, each chamber is provided with a fuel injection nozzle 10 and a spark plug 11, and the fuel is combusted and works in the chamber 12 through the interaction and cooperation between the fuel injection nozzle 10, the spark plug 11 and the rotor 13.

To further illustrate, the fuels that can be combusted in the chamber 12 include gasoline, kerosene, diesel, natural gas, hydrogen, or other new energy fuels.

Furthermore, according to the combustion performance of the fuel, the compression ratio of the chamber 12 can be freely adjusted to achieve the design of a high compression ratio.

To further illustrate, the rotor 13 is provided with n/2 pairs of intake and exhaust channels therein, and the number of pairs of the intake and exhaust channels is ½ of the number of topological sides of the cross section of the rotor 13.

Figure 2:
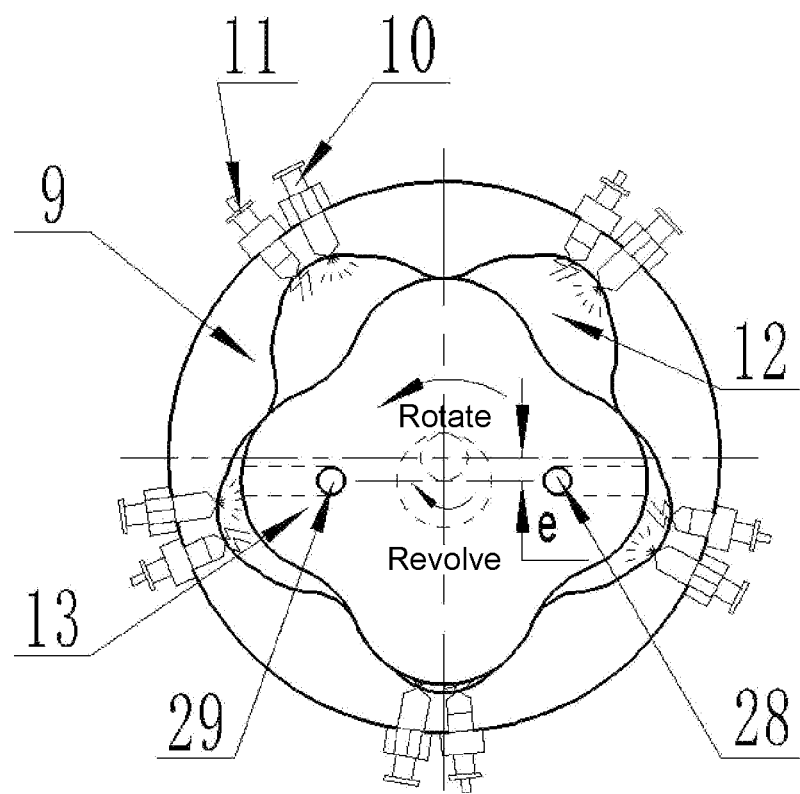
FIG. 2 is a schematic side view of the structure of the topological rotary engine in the embodiment of the disclosure.
Figure 3:
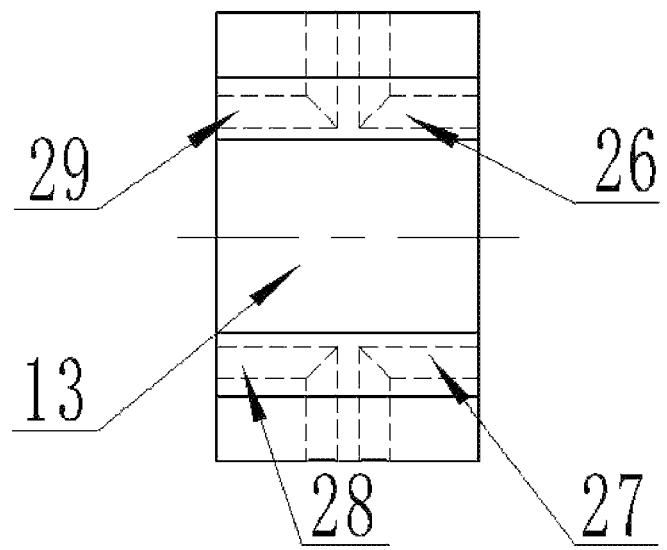
FIG. 3 is a schematic view of the distribution of the intake and exhaust channels of the rotor in the embodiment of the disclosure.
Figure 4:
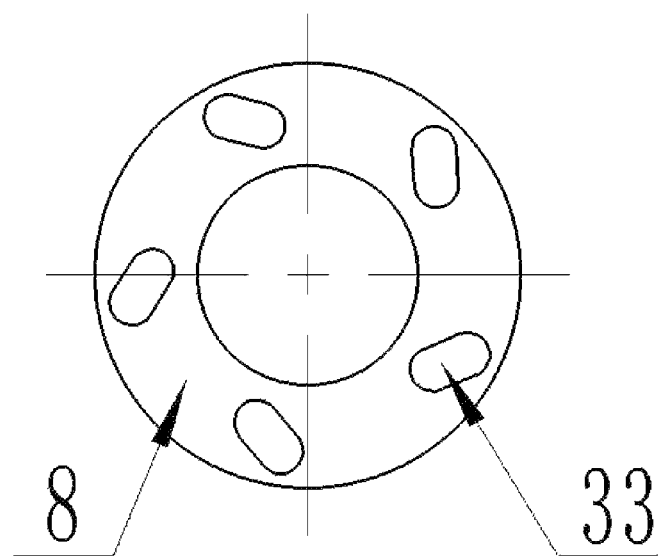
FIG. 4 is a schematic view of the structure of the valve plate in the embodiment of the disclosure.

To further illustrate, as shown in FIG. 2 and FIG. 3, an embodiment of the disclosure provides a topological rotary engine with n=4, including a rotor 13, a cylinder 9, a fuel injection nozzle 10, and a spark plug 11. The cross section of the rotor 13 is a topological quadrilateral with rounded and chamfered concave arcs. The cross section of the inner chamber of the cylinder 9 is a topological pentagon with rounded and chamfered convex arcs. The radius of the round chamfer of the cross section of the rotor 13 is equal to the radius of the round chamfer of the cross section of the inner chamber of the cylinder 9.

Specifically, the radius of the circumscribed circle of the inner chamber of the cylinder 9 is the difference between the radius of the circumscribed circle of the rotor 13 and the eccentricity $\Delta e$.

Specifically, two pairs of L-shaped intake and exhaust channels are opened from the end surface of the rotor 13 to the top surface of the round chamfer of the rotor. The rotor 13 divides the cylinder 9 into five independent chambers 12. When the rotor 13 rotates for one cycle, each of the five chambers 12 successively completes two times of air intake, compression, work, and air exhaust. More specifically, the revolution speed of the rotor 13 is four times its rotation speed, and the engine output speed is the same as the revolution speed of the rotor.

Specifically, as shown in FIG. 3, the two pairs of L-shaped intake and exhaust channels are the first intake and exhaust channel 26, the second intake and exhaust channel 27, the third intake and exhaust channel 28, and the fourth intake and exhaust channel 29. The first intake and exhaust channel 26 and the fourth intake and exhaust channel 29 are arranged in pair and are symmetrically arranged along the two ends of the rotor 13. The second intake and exhaust channel 27 and the third intake and exhaust channel 28 are arranged in pair and are arranged symmetrically along the two ends of the rotor 13.

Specifically, the fuel injection nozzle 10 and the spark plug 11 are respectively provided with five, and the fuel injection nozzle 10 and the spark plug 11 are arranged on the top of the chamber 12.

For further explanation, as shown in FIG. 1 to FIG. 4, the disclosure provides a topological rotary engine, which further includes a first transmission mechanism, a second transmission mechanism and a valve mechanism arranged in the topological rotary engine. The first transmission mechanism includes a rotor transmission shaft 14, a first bearing 24, a second bearing 23, a third bearing 31, a fourth bearing 32, a first output shaft 22, a second output shaft 1, a first counterweight plate 18, a second counterweight plate 5, a first output shaft support base 20, and a second output shaft support base 3. Two ends of the rotor transmission shaft 14 are respectively connected to the first bearing 24 and the third bearing 31. The first bearing 24 is arranged in the first counterweight plate 18. The third bearing 31 is arranged in the second counterweight plate 5. One end of the first counterweight plate 18 is provided with the first output shaft 22. The first output shaft 22 sequentially passes through the second bearing 23 and the first bearing positioning cover 21 arranged in the first output shaft support base 20. One end of the second counterweight plate 5 is provided with the second output shaft 1. The second output shaft 1 sequentially passes through the fourth bearing 32 and the second bearing positioning cover 2 arranged in the second output shaft support base 3. The second transmission mechanism includes a first internal gear 17, a first external gear 19, a first internal gear support base 16, a second internal gear 6, a second external gear 4, and a second internal gear support base 7. The first external gear 19 and the second external gear 4 are respectively fastened and assembled on both ends of the rotor transmission shaft 14. The first external gear 19 is meshed with the first internal gear 17, and the first internal gear 17 is arranged on the first internal gear support base 16. The second external gear 4 is meshed with the second internal gear 6, and the second internal gear 6 is disposed on the second internal gear support base 7. The valve mechanism includes a first valve plate 15, a second valve plate 8, and a valve chamber. The first valve plate 15 and the second valve plate 8 are symmetrically arranged on both sides of the cylinder 9, and respectively slidably cooperate with the two end surfaces of the rotor 13. To further illustrate, the rotor transmission shaft is eccentrically arranged in the dynamic balance counterweight plate of the output shaft coaxial with the cylinder through radial bearings fitted at both ends of the rotor transmission shaft. The eccentricity is the eccentricity $\Delta e$ based on which the axis of the rotor and the axis of the cylinder deviate in parallel.

Specifically, the first valve plate 15 and the second valve plate 8 have the same structure, and both are provided with valve chambers therein. The second valve plate 8 is provided with a plurality of valve grooves 33 along the circumferential direction, and each of the valve grooves 33 has an elongated-hole shape. The number of valve grooves 33 corresponds to the number of combustion chambers. The valve chamber communicates with the chamber 12 in the cylinder 9 through the valve groove 33 and the intake and exhaust channel.

Specifically, the first valve plate 15 is provided with a first vent hole 25, and the first vent hole 25 is used for the valve chamber in the first valve plate 15 to communicate with the external environment. The second valve plate 8 is provided with a second vent hole 30, and the second vent hole 30 is used for the valve chamber in the second valve plate 8 to communicate with the external environment.

Specifically, the gear ratio of the first internal gear 17 to the first external gear 19 is 5:4. The gear ratio of the second internal gear 6 to the second external gear 4 is 5:4.

To further illustrate, an embodiment of the disclosure provides a four-circle topological rotary engine with n=4, and its working process is as follows. The rotor 13 revolves in the opposite direction around the axis of the cylinder 9 with the eccentricity $\Delta e$ as the radius while rotating in the cylinder 9, thereby driving the two pairs of intake and exhaust channels thereon (first intake and exhaust channel 26, fourth intake and exhaust channel 29 and second intake and exhaust channel 27, third intake and exhaust channel 28) to respectively communicate with the valve groove 33 on the valve plates (first valve plate 15 and second valve plate 8) arranged at both sides. Along with the operation of the fuel injection nozzle 10 and the spark plug 11, the four strokes of each of the chambers 12, namely air intake, compression, work and air exhaust, are completed. One side of the valve chamber disposed on the valve plates (first valve plate 15 and second valve plate 8) arranged at both sides is an air inlet, and the other side thereof is an air outlet. When the rotor turns in the opposite direction, the air intake-and-exhaust direction of the valve chamber disposed on the two valve plates (first valve plate 15 and second valve plate 8) reverses. The eccentric configuration of the rotor transmission shaft and the output shaft can convert the revolution motion of the rotor into the rotation motion of the output shaft. When the rotor rotates for one cycle, each of the five chambers successively completes two times of air intake, compression, work and air exhaust, and its revolution speed is four times its rotation speed. Therefore, when the rotor of a four-circle topological rotary engine rotates for one cycle, its output shaft can rotate for four cycles, and the engine can do work for ten times. Based on the combustion performance of different fuels, by adjusting the structural size of the combustion chamber or the eccentricity $\Delta e$ based on which the axis of the rotor and the axis of the cylinder deviate in parallel, the compression ratio of the combustion chamber can be changed. In this manner, the four-circle topological rotary engine can be applied to different types of fuels, such as gasoline, kerosene, diesel, natural gas, hydrogen, and other new energy fuels.

Those skilled in the art can easily understand that the above descriptions are only the preferred embodiments of the disclosure and are not intended to limit the disclosure. Any modification, equivalent replacement and improvement, etc. made within the spirit and principle of the disclosure should all be included in the protection scope of the disclosure.

What is claimed is:

1. A topological rotary engine, comprising a first transmission mechanism, a second transmission mechanism, a valve mechanism, a rotor, and a cylinder arranged in the topological rotary engine, wherein the rotor is arranged in an inner chamber of the cylinder, a cross section of the rotor is a curved-side topological polygon having n sides, a cross section of the inner chamber of the cylinder is a curved-side topological polygon having n+1 sides, and n is an even number greater than or equal to 4;
   an outer topological curved surface of the rotor is meshed with an inner topological curved surface of the cylinder;
   the rotor reversely revolves around an axis of the cylinder with an eccentricity as a radius while rotating, and divides the cylinder into n+1 independent chambers; when the rotor rotates for one cycle, each of the n+1 chambers successively completes n/2 times of air intake, compression, work and air exhaust, a revolution speed of the rotor is n times a rotation speed of the rotor, and the revolution speed of the rotor is identical to an engine output speed;
   the cylinder has n+1 fuel injection nozzles and n+1 spark plugs, the fuel injection nozzles and the spark plugs cooperate with the rotor and the valve mechanism to keep a fuel to combust and work in the chamber, and output power externally through the first transmission mechanism and the second transmission mechanism,
   wherein a radius of a round chamfer of the cross section of the rotor is equal to a radius of a round chamfer of the cross section of the inner chamber of the cylinder,
   wherein the first transmission mechanism comprises a rotor transmission shaft, a first bearing, a second bearing, a third bearing, a fourth bearing, a first output shaft, a second output shaft, a first counterweight plate, a second counterweight plate, a first output shaft support base, and a second output shaft support base, both ends of the rotor transmission shaft are respectively connected to the first bearing and the third bearing, the first bearing is arranged in the first counterweight plate, and the third bearing is provided in the second counterweight plate; one end of the first counterweight plate is provided with the first output shaft, and the first output shaft sequentially passes through the second bearing and a first bearing positioning cover that are arranged in the first output shaft support base; one end of the second counterweight plate is provided with the second output shaft, and the second output shaft sequentially passes through the fourth bearing and a second bearing positioning cover that are arranged in the second output shaft support base;
   the second transmission mechanism comprises a first internal gear, a first external gear, a first internal gear support base, a second internal gear, a second external gear, and a second internal gear support base; the first external gear and the second external gear are respectively fastened and assembled on the both ends of the rotor transmission shaft; the first external gear is meshed with the first internal gear, and the first internal gear is disposed on the first internal gear support base; the second external gear is meshed with the second internal gear, and the second internal gear is disposed on the second internal gear support base;
   the valve mechanism comprises a first valve plate, a second valve plate, and a valve chamber; the first valve plate and the second valve plate are symmetrically arranged on both sides of the cylinder, and respectively slidably cooperate with the both end surfaces of the rotor.

2. The topological rotary engine according to claim 1, wherein a radius of a circumscribed circle of the inner chamber of the cylinder is a difference between a radius of a circumscribed circle of the rotor and the eccentricity.

3. The topological rotary engine according to claim 1, wherein a gear ratio of the first internal gear to the first external gear is (n+1):n; and a gear ratio of the second internal gear to the second external gear is (n+1):n.

4. The topological rotary engine according to claim 1, wherein the first valve plate and the second valve plate have a same structure, and each of the first valve plate and the second valve plate is provided with the valve chamber therein; the second valve plate is provided with a plurality of valve grooves in an elongated-hole shape along a circumferential direction, a number of the valve grooves corresponds to a number of the chamber in the cylinder; the valve chamber communicates with the chamber in the cylinder through the valve groove and the intake and exhaust channel.

5. The topological rotary engine according to claim 4, wherein the first valve plate is provided with a first vent hole, and the first vent hole is configured for the valve chamber in the first valve plate to communicate with an external environment; the second valve plate is provided with a second vent hole, and the second vent hole is configured for the valve chamber in the second valve plate to communicate with the external environment.

6. The topological rotary engine according to claim 1, wherein the rotor is provided with n/2 pairs of intake and exhaust channels, and a number of pairs of the intake and exhaust channels is ½ of a number of topological sides of the cross section of the rotor.

7. The topological rotary engine according to claim 6, wherein the rotor comprises a first intake and exhaust channel, a second intake and exhaust channel, a third intake and exhaust channel, and a fourth intake and exhaust channel; each of the first intake and exhaust channel, the second intake and exhaust channel, the third intake and exhaust channel, and the fourth intake and exhaust channel is L-shaped structures, and has two ends respectively arranged on an end surface of the rotor and a top surface of a round chamfer of the rotor.

8. The topological rotary engine according to claim 7, wherein the first intake and exhaust channel and the second intake and exhaust channel are symmetrically arranged along an axis of rotor; the third intake and exhaust channel and the fourth intake and exhaust channel are symmetrically arranged along the axis of rotor, the first intake and exhaust channel and the fourth intake and exhaust channel are symmetrically arranged at both ends of the rotor; and the second intake and exhaust channel and the third intake and exhaust channel are symmetrically arranged at the both ends of the rotor.

* * * * *